Dec. 24, 1946.  E. A. ALLEN  2,412,937
BORING HEAD
Filed June 30, 1944  2 Sheets-Sheet 1
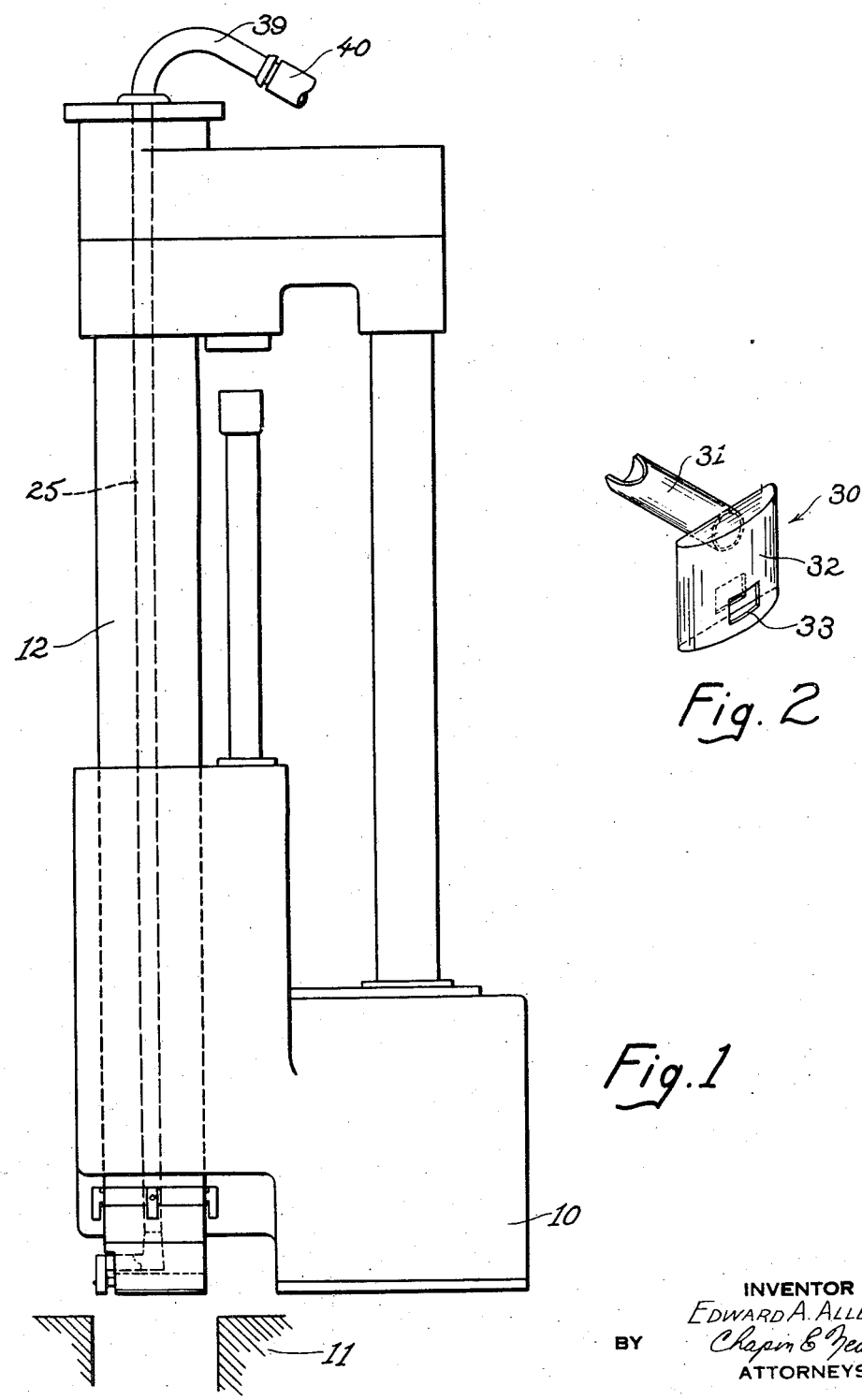
INVENTOR
EDWARD A. ALLEN
BY Chapin & Neal
ATTORNEYS Dec. 24, 1946. E. A. ALLEN 2,412,937
BORING HEAD
Filed June 30, 1944 2 Sheets-Sheet 2
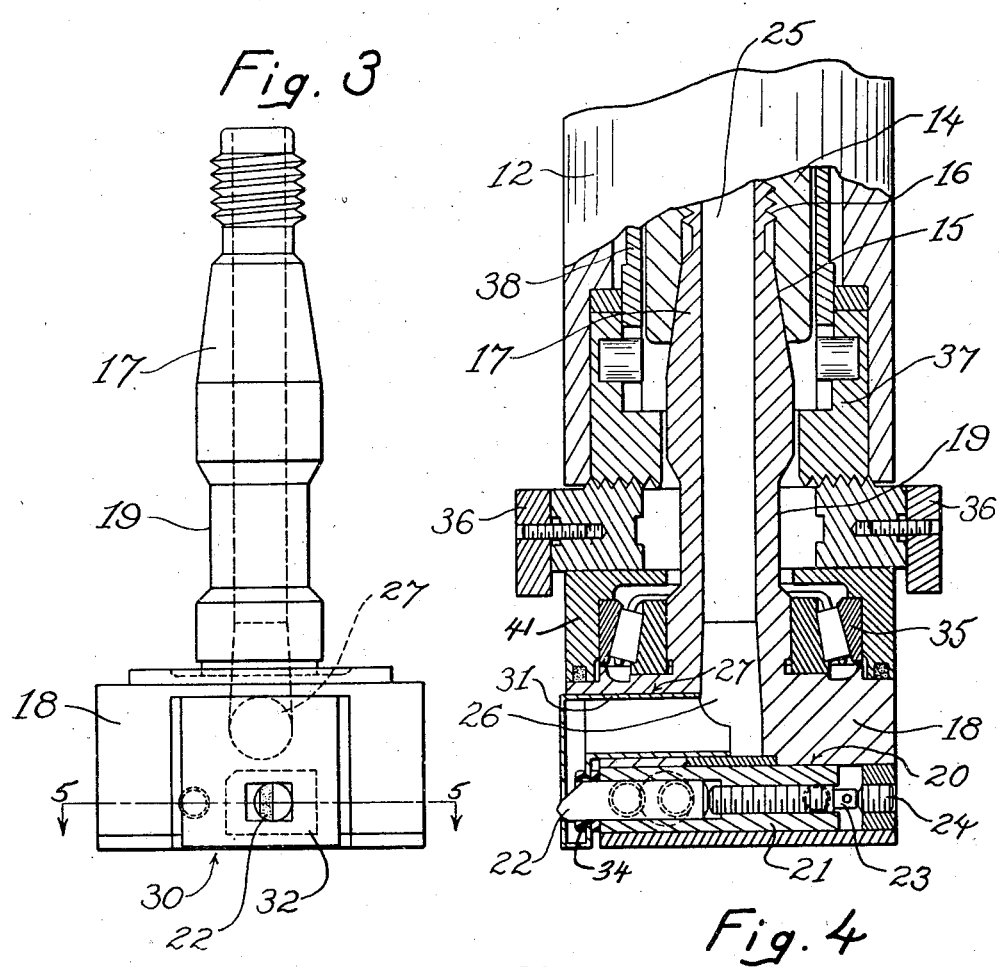
Fig. 3
Fig. 4
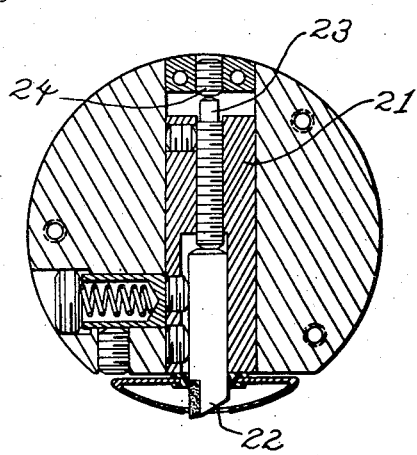
Fig. 5
INVENTOR
EDWARD A. ALLEN
BY Chapin & Neal
ATTORNEYS Patented Dec. 24, 1946

2,412,937

UNITED STATES PATENT OFFICE 2,412,937

BORING HEAD

Edward A. Allen, Westfield, Mass., assignor to Van Norman Company, Springfield, Mass., a corporation of Massachusetts Application June 30, 1944, Serial No. 542,900

2 Claims. (Cl. 77—58)

This invention relates to boring mechanism, and particularly to improvements in suction mechanism for removing chips as soon as they are formed, so as to prevent them from falling through the bored hole onto other parts of the work piece and to maintain the surface of the bored hole clean and free from metallic dust.

Prior proposals of this general nature have required that the connections for supplying suction be attached after the boring bar is secured in place, and have also required that the suction conduit be passed through the hole to be bored. In accordance with the present invention the use of a conduit passing through the bore is eliminated, and the boring bar made a self-contained structure which includes the suction conduit as a normally integral part. A further object of the invention is to combine with a rotating suction mechanism, having its suction aperture closely adjacent the tool, a non-rotating guide mechanism with sliding contact blocks which follow the boring tool and guide it by engagement with the freshly-cut surface of the bore.

The invention will now be described in connection with the accompanying drawings, in which:

Fig. 1 is a side elevation illustrating the general type of boring tool to which my invention may be applied;

Fig. 2 is a perspective view of the suction nozzle;

Fig. 3 is a detail of a cutting head with the suction nozzle in place;

Fig. 4 is a transverse section therethrough; and

Fig. 5 is a section on line 5—5 of Fig. 3.

The invention is shown as applied to a portable boring tool of the general type shown in the Arp Patent 1,868,440. It comprises a base 10 which may be anchored to the work piece 11 as set forth in that patent. Sliding vertically in the base is a sleeve 12, suitably keyed so as to prevent its rotation. Suitably journaled in the sleeve, as by roller bearings not shown, is a hollow shaft 14 (Fig. 4) provided at its lower end with a tapered socket 15 terminating in a threaded section 16. Within this socket fits the shank 17 of a boring head 18. The shank 17 is tapered to fit the socket and is threaded so that it may be screwed firmly in place. Below the maximum diameter of the tapered shank it is contracted at 19 for a purpose to be described; and finally merges into the boring head 18, which is of substantially the same diameter as the sleeve 12. The boring head has a radial socket 20 for the reception of the shank 21 of a tool bit 22. As described in the Arp patent, the tool is made adjustable to a definite bore diameter while removed from the boring head by having attached to it a screw threaded abutment 23 adapted to contact an abutment 24 within the socket 20.

The hollow bore 25 extending through the shaft 14 is aligned with a hollow bore 26 within the boring head 18. The latter bore curves outwardly at 27 above the tool socket 20, so that it opens out to the exterior of the tool head, preferably with a circular cross section. Into the latter part of the bore fits a hollow nozzle 30, conveniently made of sheet material such as brass, and having a straight portion 31 of round cross section to fit within the duct 27 and a hollow portion 32 which fits against a flattened part of the outer surface of the boring head. The portion 32 of the nozzle is cut away at 33 on both its inner and outer surface around the bit to provide a slight space around the latter. A packing 34 is preferably arranged around the tool bit so as to restrict the suction effect to the outside of nozzle 30.

It has been found that as the chips leave the bit they do not take a haphazard course but tend to move relative to the bit in one or more rather well defined paths both in front of and behind the cutting point of the tool bit. With different shapes and angles of cutting bits, as may be necessary for work of differing characteristics, the chip path may differ somewhat. A method will therefore be described whereby the chip path may be determined, as it has been found very desirable to have the outer aperture in the nozzle limited as nearly as may be to that area necessary to pick up the chips and dust, the suction effect being enhanced with a limited opening in the nozzle. Too small an aperture, however, reduces its effectiveness since the chips tend to jump the gap and escape the suction.

As a preliminary check a blank nozzle, with its external aperture closely around the tool bit, may be inserted in the boring head, coated on its periphery with blueing, and the head used in a short cutting operation. When the head is removed the nozzle will have the blueing removed along the paths taken by the chips. The nozzle is then cut away adjacent the tool bit in the chip path and the operation repeated until the chips no longer remove the blueing.

The cutter head 18 rotates within the sleeve 12 on roller bearings 35 and carries the cutter 22 and the suction nozzle 30 around with it. For convenience in manufacturing the portion 41 of the sleeve immediately surrounding the bearing is shown made separate and attached to the main body of the sleeve by means not shown. Above the cutter and the suction opening 27 are mounted a plurality of guide members 36 which pass down the freshly cut bore and guide the boring bar in its cutting operation as described in Arp Patent 1,868,440 previously mentioned. These members are adjustable by a spiral thread on a scroll member 37 controllable in position from the top of the bar by a sleeve 38. It is very desirable that the chips be cleaned off from the cylinder wall prior to contact of the guide members 36 with the freshly cut surface. It is also desirable to avoid any necessity for connecting the suction line to the lower end of the boring bar, since the adjustable feature of the tool bit requires that it extend radially of the boring bar in such a manner as to block a direct connection of a suction line axially of the boring bar. An eccentric connection to the rotating head 18 would of course be extremely undesirable. By the construction described, the suction may be applied by a connection 39 to a flexible hose 40 made at the top of the boring head. A further advantage of locating the suction hose at this point is that no special swivel connection need be made, it being sufficient only for a short length of the connector 39 to pass into the upper end of the bore 25.

I claim:

1. In a boring bar of the type having a reciprocable but non-rotatable guiding sleeve and a shaft rotatably mounted within the sleeve and reciprocable therewith, a cutter head having an extension projecting upwardly and secured to said shaft, a bearing between said upward extension and the sleeve, a radially extending cutter bit located in the cutter head below said bearing, said cutter head having a radial passageway between the cutter bit and the bearing, said extension having an axial passageway connecting with the radial passageway and the shaft having an axial passageway, and a suction hood held within the radial passageway and having an aperture adjacent the tool bit.

2. In a boring bar of the type having a reciprocable but nonrotatable guiding sleeve and a shaft rotatably mounted within the sleeve and reciprocable therewith, a cutter head having an extension projecting upwardly and secured to said shaft, a bearing between said upward extension and the sleeve, a radially extending cutter bit located in the cutter head below said bearing, said cutter head having a radial passageway between the cutter bit and the bearing, said extension having an axial passageway connecting with the radial passageway and the shaft having an axial passageway, and a suction hood held within the radial passageway and having a hollow chamber provided with opposed apertures permitting it to fit over the tool bit and providing a suction aperture adjacent the point of the tool bit.

EDWARD A. ALLEN.